United States Patent Office 3,433,594
Patented Mar. 18, 1969

3,433,594
PROCESS FOR PREPARING PIGMENTARY TITANIUM DIOXIDE
William L. Wilson, Barberton, Harry Lott, Jr., Akron, and Albert Dietz, Wadsworth, Ohio, assignors to PPG Industries, Inc., Pittsburgh, Pa., a corporation of Pennsylvania
No Drawing. Filed Oct. 1, 1965, Ser. No. 492,317
U.S. Cl. 23—202　　　　　　　　　　　　　　　8 Claims
Int. Cl. C01g *23/04;* C09c *1/36*

ABSTRACT OF THE DISCLOSURE

Pigmentary titanium dioxide prepared by vapor phase oxidation of titanium tetrahalide is improved by contacting titanium dioxide entrained in gaseous effluent withdrawn from the vapor phase oxidation reaction zone with a source of at least one Group I metal, Group II metal and silicon.

---

This invention relates to a process for treating titanium oxide pigment produced by a vapor phase reaction. More particularly, this invention relates to a process of withdrawing titanium oxide pigment from a vapor phase reaction zone within a hot effluent stream and treating the pigment while dispersed in said stream.

Titanium oxide pigment may be produced by the vapor phase reaction of a titanium halide, usually a titanium tetrahalide such as $TiCl_4$, $TiBr_4$, or $TiI_4$, with an oxidizing agent at a temperature of 800 to 1600° C. Typical oxidizing or oxygenating agents include air, oxygen, oxides of nitrogen, and oxides of phosphorous. Examples of such vapor phase oxidation processes are disclosed in U.S. Letters Patent 2,968,529 and 3,069,281, issued to William L. Wilson. Likewise, the titanium halide may be reacted in the vapor phase with a hydrolyzing agent such as water, as disclosed, for example, in British Patent 726,250. Such vapor phase reactions may be conducted in the presence of a fluidized bed, as disclosed, for example, in U.S. Letters Patent 2,964,386.

In accordance with the practice of this invention, a gaseous effluent stream containing entrained titanium oxide pigment is withdrawn from a vapor phase reaction zone and the hot stream immediately contacted in a second zone with a source of at least one selected metal.

More particularly, at least one source of at least one metal selected from potassium, sodium, lithium, cesium, rubidium, barium, calcium, strontium, magnesium, and zinc is added to a gaseous effluent stream containing entrained titanium oxide pigment, the pigment in the effluent stream having an average temperature of at least 475° F. and the effluent gases containing less than 10 percent by weight, preferably less than 5 percent by weight, unreacted titanium tetrahalide based on the total titanium tetrahalide introduced into the vapor phase reaction zone.

More especially, in accordance with the practice of this invention, the gaseous effluent stream containing entrained pigment is withdrawn and recovered from a vapor phase reaction which is at least 90 percent, preferably at least 95 percent, complete based on the titanium tetrahalide introduced into the reaction zone.

Titanium tetrahalide, as used herein, is defined as one or more members selected from $TiCl_4$, $TiBr_4$, and $TiI_4$.

The source of the selected metal is added to the hot effluent stream in an amount sufficient to provide 0.01 to 5,000 parts by weight of the metal per million parts by weight of the titanium oxide pigment in the effluent stream. With certain metals, particularly K, Rb, and Cs, it is suitable to add less than 1,000 parts by weight of the metal per million parts by weight of the pigment.

It is contemplated in one embodiment of this invention that a source of silicon may be added to the hot effluent stream in addition to the Group I and Group II metals noted hereinbefore.

It is especially effective to add the silicon source in conjunction with a source of potassium, zinc, rubidium, and/or cesium.

It is particularly contemplated that the hereinafter combinations of metals or the source thereof may be added the effluent stream:

(1) Zn and Si
(2) Zn and K
(3) Zn and Rb
(4) Zn and Cs
(5) K and Si
(6) K and Rb
(7) K and Cs
(8) Rb and Si
(9) Zn, K, and Si
(10) Zn, Rb, and Si
(11) Zn, Cs, and Si.

The silicon source is added to the hot effluent stream in an amount sufficient to provide 0.0001 to 1.0 percent, preferably .05 to 0.5 percent, by weight silicon based on the weight of the titanium oxide pigment in the effluent stream.

The total weight of the metals added to the effluent should not exceed 5.0 percent by weight of the pigment in the effluent, preferably less than 2.5 percent by weight.

The source materials of the various Group I, Group II, and/or silicon metals may be the metal in elemental state and/or compounds of the metals.

Compounds which may be used as the source of the Group I metals, Group II metals, and silicon metals include, not by way of limitations, organic and inorganic halides (i.e., chlorides, bromides, iodides, and fluorides), oxyhalides (particularly the oxychlorides and oxybromides), nitrates, nitrites, nitrides, sulfates, sulfites, sulfides, oxynitrates, oxysulfates, carbides, hydroxides, oxides, carbonates, phosphates, phosphides, phosphites, borates, perborates, perhalogenates (e.g., perchlorates, perbromates, periodates, perfluorates), persulfates, nitrates, and hydrates thereof.

It is further contemplated using organometals such as the alkyls, alkenyls, alkynyls, aryls, arylalkyls, arylalkenyls, arylalkynyls, heterocyclics, thioalkyls, alkoxys, alkoxides, alkyl ether complexes, and derivatives thereof.

Although it is preferred that the source be added to the effluent stream in a vaporous or gaseous state, it also may be added in a liquid state. It is also contemplated adding the source in a solid state, providing the solid material is finely divided and has a mean diameter of less than 1.0 micron, preferably less than 0.5 micron. Solid metal oxides are especially effective when added to a hot effluent stream containing halogen gas, e.g., chlorine.

Examples of potassium source as contemplated herein include, not by way of limitation, elemental potassium, $KHSO_4$, $K_2S$, $KHS$, $K_2S_2$, $K_2O$, $K_2O_2$, $KCl$, $KBr$, $KI$, $KF$, $KNO_2$, $K_2CO_3$, $K_2SO_4$, $KHCO_3$, $KOH$, potassium laurate, potassium benzoate, potassium diborane, and potassium malate.

Examples of sodium source as contemplated herein include, not by way of limitation, elemental sodium, $NaCl$, $NaF$, $NaBr$, $NaI$, $Na_2CO_3$, $Na_2O$, $NaSCN$, $Na_2S_4$, $Na_2S_5$, $NaNO_2$, $NaOH$, $Na_2SO_4$, $Na_2S_2$, $Na_2S$, $Na_2O_2$, sodium benzoate, sodium malate, sodium pentaborane, and sodium acetate.

Examples of lithium source as contemplated herein include, not by way of limitation, elemental lithium, LiCl, LiBr, LiI, LiF, LiNO$_2$, Li$_2$O, LiSCN, Li$_2$SO$_4$, Li$_2$S$_4$, Li$_2$S$_5$, Li$_2$CO$_3$, lithium benzoate, LiHCO$_3$, Li$_2$S$_2$, lithium malate, LiOH, lithium metaperiodate, and lithium peroxide.

Examples of cesium source as contemplated herein include, not by way of limitation, elemental cesium, CsCl, CsBr, CsF, CsI, cesium acetate, cesium benzoate, cesium bromate, CsBr$_3$, CsI$_5$, cesium hydrogen nitrate, cesium sulfate, CsOH, Cs$_2$O, Cs$_2$S$_2$, Cs$_2$O$_2$, Cs$_2$S$_5$, cesium malate, CsHCO$_3$, Cs$_2$CO$_3$, and CsNO$_2$.

Examples of rubidium sources as contemplated herein include, not by way of limitation, elemental rubidium, RbCl, RbF, RbI, RbBr, Rb$_2$CO$_3$, Rb$_2$S$_2$, RbNO$_2$, RbCl$_5$, RbI$_5$, RbBr$_5$, BrOH, Rb$_2$O, Rb$_4$O$_6$, Rb$_2$SO$_4$, rubidium benzoate, and rubidium acetate.

Examples of zinc sources as contemplated herein include, not by way of limitation, elemental zinc, zinc acetate, zinc amide, ZnCO$_3$, ZnCl$_2$, ZnBr$_2$, ZnF$_2$, ZnI$_2$, zinc valerate, zinc thiocyanate, diethylzinc, zinc stearate, zinc sulfate, ZnS, zinc picrate, ZnO, and Zn(OH)$_2$.

Examples of silicon sources as contemplated herein include, not by way of limitation, elemental silicon, the silanes such as monosilane, the alkylsilanes such as silicon tetraethyl, organosilicon halides such as CH$_3$SiH$_2$Cl, silicon halides such as SiCl$_4$, SiBr$_4$, SiI$_4$, SiF$_4$, SiHCl$_3$, SiI$_2$, SiCl$_2$, tripropylsilanol, ethyltriphenylsilane, CH$_3$SiBr$_3$, and SiO$_2$.

Additional source compounds of potassium, sodium, lithium, cesium, rubidium, zinc, and silicon may be found in U.S. Letters Patent 3,356,456, and are incorporated herein by reference.

Examples of barium, calcium, strontium, and magnesium sources as contemplated herein include, not by way of limitation, elemental barium, barium acetate, BaCl$_2$, BaBr$_2$, BaI$_2$, BaF$_2$, Ba(NH$_2$)$_2$, barium butyrate, BaCO$_3$, BaO, barium hydroxide and hydrates thereof, BaN$_6$, barium perchlorate, BaO$_2$, Ba(ClO$_3$)$_2$, barium thiosulfate, Ba(ClO$_4$)$_2$, barium perbromate, barium persulfate, elemental calcium, calcium hypochlorite, calcium hypophosphite, CaCl$_2$, CaF$_2$, CaBr$_2$, CaI$_2$, calcium lactate, Ca(NO$_3$)$_2$, calcium oxalate, CaO, calcium perchlorate, calcium salicylate, CaSiF$_6$, CaSO$_4$, calcium sulfhydrate, CaCS$_3$, Ca(OH)$_2$, elemental strontium, strontium acetate, SrCl$_2$, SrF$_2$, SrBr$_2$, SrI$_2$, SrCrO$_4$, Sr(SH)$_2$, Sr(OH)$_2$, Sr(IO$_3$)$_2$, Sr(NO$_2$)$_2$, SrO, SrO$_2$, SrSiO$_3$, SrS, elemental magnesium, magnesium acetate, MgCl$_2$, MgBr$_2$, MgF$_2$, MgI$_2$, Mg$_3$N$_2$, MgS, MgSO$_4$, and magnesium ammonium chromate.

The composition of the gaseous effluent stream will vary with each particular titanium tetrahalide vapor phase reaction process. Where the process involves the vapor phase oxidation of TiCl$_4$, the effluent typically contains unreacted TiCl$_4$, oxygenating agent such as oxygen, and chlorine gas generated by the reaction. Likewise, chlorine gas may be added to the reaction zone as taught, for example, in the prior art noted hereinbefore. The effluent may also contain CO, CO$_2$, SO, SO$_2$, where sulfur or carbon materials are utilized as fuel to heat the reaction zone. There also may be present small amounts of other metal oxides such as Al$_2$O$_3$ and SiO$_2$.

It is contemplated in the practice of this invention that the selected metals or the source thereof be added to the effluent in a second zone separate from and sufficiently remote from the reaction zone so as to ensure that none of the metal (or source thereof) is physically recirculated back into the reaction zone. Typically, the metal source may be added to the effluent with an auxiliary or recycle stream as disclosed, for example, in copending U.S. patent application Ser. No. 382,095, filed July 13, 1964, now abandoned.

In a preferred embodiment, it is contemplated adding the selected metal or source thereof within 0.001 to 10 seconds, preferably 0.05 to 5 seconds.

When hot titanium oxide pigment is treated in an effluent stream in accordance with this invention, the surface energy of the pigment is significantly reduced and the pKa therefore increased. The pKa of the pigment surface is determined as disclosed in copending U.S. patent application Ser No. 469,881, filed July 6, 1965 by Dr. Albert Dietz and Dr. Harry Lott, Jr., which corresponds to French Patent 1,484,210.

The following is a typical working example representing the best mode contemplated by the inventors in the carrying out of this invention:

EXAMPLE

A concentric feed tube and a vertical cylindrical reactor arrangement is used as disclosed in U.S. Letters Patent 3,214,284.

Titanium tetrachloride (TiCl$_4$) at 14.7 pounds per square inch absolute pressure and preheated to 800° F. is introduced through the outermost annulus formed by three concentric tubes (as disclosed in U.S. Ser. No. 190,140) into the upper portion of the vertical reactor at 32 gram-moles per minute. The TiCl$_4$ contains 3 mole percent AlCl$_3$ and 0.55 mole percent SiCl$_4$ based on the total moles of TiCl$_4$.

Heat is supplied to the reactor by the combustion of 17.4 gram-moles per minute of CO and 48.4 gram-moles per minute of oxygen in a chamber separate from the reactor as disclosed in copending U.S. application Ser. No. 234,962, filed Nov. 2, 1962, now abandoned, the products of combustion and the exothermic heat evolved immediately being flowed through the central tube of the three concentric tubes into the upper portion of the vertical reactor.

Simultaneously, 5.7 gram-moles per minute of chlorine shroud at 800° F. is introduced into the reactor through the innermost annulus formed by the three concentric tubes.

One hundred twenty-six (126) gram-moles per minute of effluent gaseous product at an average temperature above 1500° F. is withdrawn at the bottom of the reactor as disclosed in copending U.S. patent application Ser. No. 382,095, filed July 13, 1964, now abandoned.

The stream comprises 31.7 gram-mole per minute of titanium oxide, 0.3 gram-mole per minute of vaporous TiCl$_4$, 69.1 gram-moles per minute of chlorine, 8.0 gram-moles per minute of oxygen, and 17.4 gram-moles per minute of CO$_2$.

At a point remote from the reactor exit, the effluent stream is merged with an auxiliary gas at 142° F. which comprises 0.015 gram-mole per minute of KCl, 0.74 gram-mole per minute of TiCl$_4$, 160.00 gram-moles per minute of chlorine, 40.22 gram-moles per minute of CO$_2$, and 18.63 gram-moles per minute of oxygen. The resulting mixed stream comprising auxiliary and effluent gases and entrained pigment has a temperature of 900° F. The stream is cooled to below 300° F. and the titanium oxide pigment recovered with bag filters. The pigment has a tinting strength of 1690 as determined by A.S.T.M. D–332–26, "1949 Book of A.S.T.M. Standards," part 4, p. 31, published by American Society for Testing Material, Philadelphia 3, Pa., and a pKa value of +4.0, +3.3.

Although this invention has been described hereinbefore with reference to adding the metal source with an auxiliary gas stream, it is contemplated that such may be added to the effluent independently of the auxiliary stream. Thus, where an auxiliary or recycle stream is not employed, it is contemplated controllably adding a metal source, e.g., KCl, through a small opening in an effluent conduit leading from the reactor exit. Likewise, the metal source may be added by constructing the conduit out of a ceramic or other material containing the source, e.g., oxides of the alkali metals such as K$_2$O.

This invention is not limited to a process wherein the reaction is heated by CO combustion. Thus, it is contemplated that heat may be supplied to the reactor with an electric or plasma arc as disclosed, for example, in British patent specification 1,035,191. When a plasma arc is solely used as the heat source, the effluent stream will not contain any products of fuel combustion, e.g., $CO_2$.

While this invention has been described by reference to specific details of certain embodiments, it will be understood that the invention is not intended to be construed as limited to such details, except insofar as they are included in the appended claims.

We claim:

1. In a process for producing pigmentary titanium dioxide by vapor phase oxidation of titanium tetrahalide with an oxygenating gas in a reaction zone, the improvement which comprises reducing the surface energy of the pigment thus produced by withdrawing a gaseous effluent containing entrained pigmentary titanium dioxide from said vapor phase reaction zone and contacting said entrained titanium dioxide with an added source of at least one metal selected from the group consisting of potassium, sodium, lithium, cesium, rubidium, barium, calcium, strontium and magnesium.

2. The process of claim 1 wherein the average temperature of the entrained pigment is at least 475° F.

3. The process of claim 1 wherein the source of the selected metal provides from 0.01 to 5,000 parts by weight of said metal per million parts by weight of entrained titanium dioxide.

4. The process of claim 1 wherein said entrained titanium dioxide is also contacted with a source of silicon sufficient to provide from 0.0001 to 1.0 weight percent silicon based on the amount of entrained titanium dioxide.

5. The process of claim 1 wherein the total amount of selected metal used is less than 5.0 weight percent based on the amount of entrained titanium dioxide.

6. The process of claim 1 wherein the entrained titanium dioxide is contacted with a source of metallic potassium and, in combination therewith, is also contacted with a source of metallic zinc.

7. The process of claim 4 wherein said entrained titanium dioxide is contacted with a source of metallic potassium and a source of metallic silicon.

8. The process of claim 7 wherein said entrained titanium dioxide is also contacted with a source of metallic zinc.

References Cited

UNITED STATES PATENTS

| | | |
|---|---|---|
| 3,068,113 | 12/1962 | Strain et al. |
| 3,105,742 | 10/1963 | Allen et al. |
| 3,112,210 | 11/1963 | Carpenter _____ 106—300 |
| 3,208,866 | 9/1965 | Lewis et al. _____ 106—300 |
| 3,214,284 | 10/1965 | Wilson _____ 106—300 |
| 3,245,818 | 4/1966 | Evans et al. _____ 106—300 |
| 3,275,411 | 9/1966 | Freeman et al. |
| 3,275,412 | 9/1966 | Skrivan. |
| 3,306,760 | 2/1967 | Zirngibl et al. |
| 3,337,300 | 8/1967 | Hughes et al. _____ 23—202 |
| 3,356,456 | 12/1967 | Wilson. |

FOREIGN PATENTS 627,782   7/1963   Belgium.

EDWARD STERN, *Primary Examiner.*

U.S. Cl. X.R.

106—300